No. 854,838. PATENTED MAY 28, 1907.
J. A. PARSONS.
SHOVEL TOOTH.
APPLICATION FILED MAY 19, 1906.

WITNESSES:
M. A. Schmidt
Geo. E. Tew

INVENTOR
James A. Parsons
BY Milo B. Stevens & Co.
Attorneys.

UNITED STATES PATENT OFFICE.

JAMES A. PARSONS, OF CHICAGO, ILLINOIS.

SHOVEL-TOOTH.

No. 854,838.　　　Specification of Letters Patent.　　　Patented May 28, 1907.

Application filed May 19, 1906. Serial No. 317,715.

*To all whom it may concern:*

Be it known that I, JAMES A. PARSONS, a citizen of the United States, residing at Chicago, in the county of Cook and State of Illinois, have invented new and useful Improvements in Shovel-Teeth, of which the following is a specification.

This invention is a tooth for the shovels or scoops of excavators and has for its object to provide an improved means for fastening the tooth to the shovel without the use of bolts or screws, and in such manner that the tooth can be readily removed and teeth of other shapes quickly substituted, according to the kind of material to be excavated.

For use with hard material such as blast, furnace slag, rock, cemented gravel and the like, a small and sharp pointed tooth is provided, while for use with all kinds of soft material, such as clay, sand, coal, dirt, and the like, a broader and larger point is advisable. By means of the change of the points all classes of material can be operated on in a satisfactory manner.

The invention is illustrated in the accompanying drawings, in which

Figure 1:
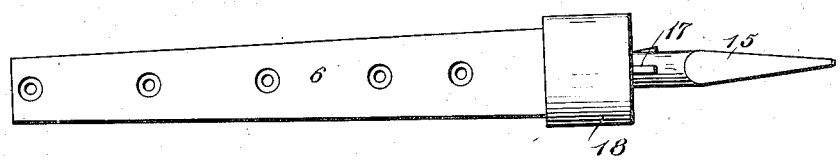
Figure 2:
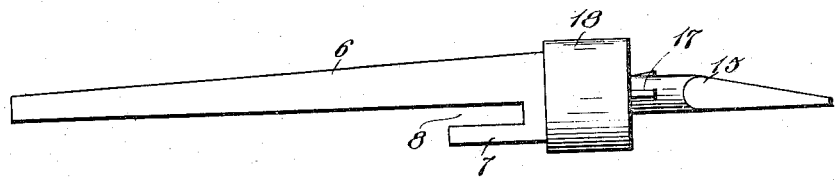
Figure 3:
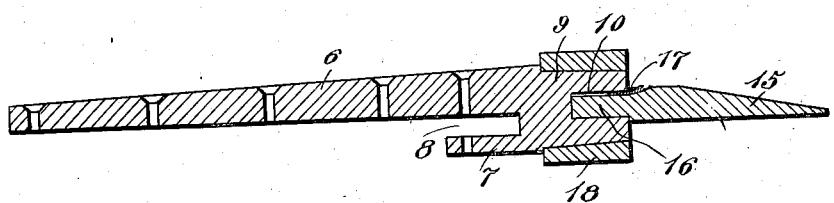

Figure 1 is a top plan view of the slag tooth, or tooth for hard material. Fig. 2 is a side elevation thereof. Fig. 3 is a central vertical longitudinal section thereof.

Referring specifically to the drawings, the shank of the tooth has an upper jaw 6, and a lower jaw 7, between which the front edge of the scoop is received in the slot 8. Projecting forwardly from the jaws is a circular socket piece 9 which tapers slightly toward the front and has therein a rectangular socket 10.

For excavating hard material a small point is used. This consists of a tooth 15 which is squared at the rear end, as at 16, to fit within the socket 10 in the shank. Ways 17 are cut in the side of the tooth so that wedges may be driven in to set the tooth tight. Furthermore, a tapered ferrule 18 is then driven on the head 9 and operates by its clamping action to securely fasten the tooth in place. In the operation of the shovel the ferrule naturally becomes worn on the under side, but may then be turned half way around, and so used until worn out. The points may be similarly loosened and removed by knocking off the ferrules, and new points substituted. There are no nuts or bolts to bother with and a very economical and efficient set of teeth are provided.

I claim:

In a shovel tooth, the combination of a shank having a forwardly extending tapered circular projection with a non-circular socket therein, a point having a non-circular grooved rear end fitting in the socket, a tapered ferrule fitting over the projection, and a wedge in the groove, between the point and the wall of the socket.

In testimony whereof I have signed my name to this specification in the presence of two subscribing witnesses.

JAMES A. PARSONS.

Witnesses:
　NELLIE FELTSKOG,
　H. G. BATCHELOR.